United States Patent
Schmidt et al.

(10) Patent No.: US 7,775,608 B2
(45) Date of Patent: Aug. 17, 2010

(54) METHOD FOR CONTROLLING A BRAKE PRESSURE

(75) Inventors: Holger Schmidt, Wettenberg (DE); Anthony Dollet, Weiterstadt-Braunshard (DE); Urs Bauer, Ludwigsburg (DE); Stephan Capellaro, Dietzingen (DE)

(73) Assignee: Continental Teves, Inc., Auburn Hills, MI (US)

( * ) Notice: Subject to any disclaimer, the term of this patent is extended or adjusted under 35 U.S.C. 154(b) by 768 days.

(21) Appl. No.: 10/583,022

(22) PCT Filed: Dec. 21, 2004

(86) PCT No.: PCT/EP2004/053627

§ 371 (c)(1), (2), (4) Date: Apr. 9, 2007

(87) PCT Pub. No.: WO2005/063538

PCT Pub. Date: Jul. 14, 2005

(65) Prior Publication Data

US 2007/0188020 A1   Aug. 16, 2007

(30) Foreign Application Priority Data

Dec. 23, 2003   (DE) ................................. 103 61 495

(51) Int. Cl.
  *B60T 8/60*   (2006.01)
(52) U.S. Cl. ................. 303/148; 303/150; 303/DIG. 6; 701/73
(58) Field of Classification Search ................. 303/146, 303/147, 148, 149, 150, 170, DIG. 6; 701/41, 701/73
See application file for complete search history.

(56) References Cited

U.S. PATENT DOCUMENTS

| 5,066,074 | A | * | 11/1991 | Wupper | 303/148 |
| 5,498,071 | A | * | 3/1996 | Oikawa et al. | 303/149 |
| 5,520,448 | A | * | 5/1996 | Okubo | 303/148 |

(Continued)

FOREIGN PATENT DOCUMENTS

| DE | 19707106 | 10/1997 |
| EP | 1354788 | 10/2003 |
| WO | 02074638 | 9/2002 |
| WO | 02083471 | 10/2002 |
| WO | 2004005093 | 1/2004 |

*Primary Examiner*—Thomas J Williams

(57) ABSTRACT

A method for controlling a brake pressure in at least two wheel brakes preferably mounted on one axle of the vehicle, is performed during a braking operation on a road surface having a heterogeneous coefficient of friction.

This method works as follows:
  A low coefficient of friction side and/or a high coefficient of friction side is detected,
  a stability index representing the driving state of the vehicle is formed,
  the stability index is evaluated on the basis of the low coefficient of friction side and/or of the high coefficient of friction side and
  the brake pressure is altered in at least one wheel brake as a function of the value of the stability index and as a function of the result of the evaluation of the stability index on the basis of the low coefficient of friction side and/or the high coefficient of friction side.

20 Claims, 6 Drawing Sheets

U.S. PATENT DOCUMENTS 5,688,029 A * 11/1997 Bach et al. .................. 303/148
5,934,769 A * 8/1999 Brachert et al. ............. 303/146
6,968,920 B2 * 11/2005 Barton et al. ................ 701/41
2002/0198646 A1 12/2002 Bedner et al.
2003/0111899 A1 * 6/2003 Heinemann ................ 303/148
2003/0221898 A1 * 12/2003 Yasui et al. ................. 180/446
2004/0138803 A1 * 7/2004 Mahlo et al. ................. 701/71

* cited by examiner

METHOD FOR CONTROLLING A BRAKE PRESSURE

BACKGROUND OF THE INVENTION

The invention relates to a method for controlling the brake pressure in at least one wheel brake mounted on a vehicle axle during a braking operation on a road surface having a heterogeneous coefficient of friction.

The invention also relates to a device for controlling the brake pressure difference between the brake pressure in a wheel brake on the low coefficient of friction side and the brake pressure in a wheel brake on the high coefficient of friction side of the vehicle with a heterogeneous coefficient of friction.

When braking on a heterogeneous road surface having different coefficients of friction on the right and left longitudinal sides of the vehicle, asymmetrical braking forces may occur, resulting in a yawing torque which induces a rotational movement of the vehicle about its vertical axis. To prevent skidding of the vehicle, the driver must build up a compensatory yawing torque for suitable steering movements to counteract the torque produced by the asymmetrical braking forces. Locking of the wheels should be avoided here, even on the side of the vehicle having the low coefficient of friction, because the great reduction in transmissible lateral traction of a wheel associated with such locking can prevent a buildup of the required compensatory torque.

In vehicles having an antilock brake system (ABS), locking of the wheels is prevented by a controller. In situations of the aforementioned type, a control strategy conventionally used pursues the goal of decelerating the vehicle with a short braking distance by means of the highest possible brake pressure in the wheel brakes on the side of the vehicle having the higher coefficient of friction. On the other hand, the driver should not be overstressed due to a yawing torque caused by different braking forces on the side with the low coefficient of friction versus the side with the high coefficient of friction (driver response time in countersteering).

Therefore, in the situations in question, the brakes are controlled on the basis of a so-called yawing torque buildup delay (GMA) so that a difference between the brake pressures on the high and low coefficient of friction sides is built up only slowly on the front axle of the vehicle in order to allow the driver enough time to execute stabilizing steering maneuvers. In the wheel brakes on the rear axle, the brake pressure is limited to the value allowed for the low coefficient of friction side ("select low") so that enough lateral traction can be built up on the rear axle to be able to stabilize the vehicle through steering intervention measures.

The measures described here allow the driver a simpler means of controlling the vehicle, but the potential coefficient of friction on the high coefficient of friction side is not optimally utilized for decelerating the vehicle.

Unexamined German Patent DE 197 07 106 A1 describes how the brake pressure in the wheel brake on the wheel on the high coefficient of friction side, the so-called high wheel, may be controlled on the basis of a quantity representing the driving status of the vehicle, said quantity being formed as a function of the deviation between the yaw rate of the vehicle and a nominal yaw rate calculated from the steering angle set by the operator of the vehicle. Thus, instead of the select-low control method described above, a brake pressure control method that is individual for each wheel is used.

If the vehicle yaws in the direction of the high coefficient of friction side, a pressure buildup on the high wheel, however, leads to an intensification of the yawing motion of the vehicle. The known method thus has the disadvantage that it could destabilize the driving status of the vehicle in possible driving situations.

Therefore the object of the present invention is to improve upon the braking performance of a vehicle in braking on a heterogeneous road surface and at the same time to reliably ensure the driving stability of the vehicle.

SUMMARY OF THE INVENTION

According to this invention, a method of controlling the brake pressure in at least one wheel brake mounted on a vehicle axle during a braking operation on a road surface having a heterogeneous coefficient of friction is performed so that the low coefficient of friction side and/or the high coefficient of friction side of a vehicle is/are detected, a stability index is formed, representing the driving status of the vehicle, the stability index is evaluated on the basis of the low coefficient of friction side and/or the high coefficient of friction side and the brake pressure in at least one wheel brake is modified as a function of the value of the stability index and as a function of a result of the evaluation of the stability index on the basis of the low coefficient of friction side and/or the high coefficient of friction side.

This method has the advantage that it includes a determination of which longitudinal side of the vehicle is the low coefficient of friction side and which is the high coefficient of friction side, and then the stability index is evaluated on the basis of the low coefficient of friction side. This makes it possible to evaluate whether a change in the brake pressure in one wheel brake and in particular an increase in pressure in the wheel brake of the high wheel on the rear axle could lead to an intensification of a yawing motion of the vehicle in the direction of the high coefficient of friction side, thereby resulting in a destabilization of the driving status of the vehicle or whether such an unfavorable effect of the change in brake pressure in a wheel brake need not be expected.

It is thus possible in particular to increase the brake pressure in the wheel brake of the high wheel on the rear axle of the vehicle in driving situations in which this would not result in any negative effect on vehicle stability. In such situations, the brake power can be increased effectively on the basis of the inventive method.

The change in brake pressure is preferably superimposed on an ABS control procedure. In an advantageous embodiment of the invention, ABS control is therefore preferably implemented for one wheel on the low coefficient of friction side and the brake pressure difference between the brake pressures in the wheel brake on the high coefficient of friction side and in the wheel brake on the low coefficient of side is determined, with the wheel brakes preferably being mounted on a vehicle axle.

A select-low control method may thus be modified so that the brake pressure on the rear wheel on the high coefficient of friction side is increased when the prevailing driving status is stable and thus the braking distance of the vehicle is shortened.

The stability index is advantageously formed as a function of a steering angle on steerable wheels of the vehicle and/or a yawing rate or yaw rate deviation of the vehicle to make the vehicle performance objectively evaluable.

It is thus possible to take into account in the stability index quantities that reflect and/or directly influence the yawing performance of the vehicle. Thus a direct evaluation of the yawing performance of the vehicle is performed on the basis of the evaluation of the stability index.

In an advantageous embodiment of the invention, the stability index is determined on the basis of a deviation between an instantaneous steering angle and a steering angle prevailing at the start of the braking operation on a road surface having a heterogeneous coefficient of friction.

In this way it is possible to determine on the basis of the stability index whether the driver of the vehicle is countersteering during the braking operation on a heterogeneous road surface to generate a yawing torque which counteracts the interfering yawing torque which results due to the difference in braking forces on the high and low coefficient of friction sides and the presence of which permits a safe increase in braking pressure in the wheel brake of the high wheel.

In another advantageous embodiment of the invention, the stability index is determined on the basis of a deviation between an instantaneous yaw rate of the vehicle and a reference yaw rate determined in a vehicle model on the basis of a steering angle prevailing at the start of the braking operation.

The reference yaw rate determined in this way represents the yaw rate corresponding to the driver's intent. On the basis of the deviation between the reference yaw rate and the instantaneous yaw rate of the vehicle, it is therefore possible to recognize in turn whether the driver has taken suitable measures to compensate for the interfering yawing torque.

The inventive method may be implemented to particular advantage in a vehicle in which a nominal steering angle can be calculated and adjusting independently of the driver's specification, for example, by means of a superimposed steering or a steer-by-wire steering.

In another preferred embodiment of this invention, the stability index is determined as a function of a deviation between a steering angle commanded by the operator of the vehicle and a nominal steering angle set on the steerable wheels of the vehicle and thus the driving status of the vehicle is made accessible to an objective evaluation.

The nominal steering angle preferably contains a control component which is determined in a vehicle model as a function of the interfering yawing torque.

The nominal steering angle may be determined in particular so that it produces a yawing torque that compensates for the interfering yawing torque.

The nominal steering angle advantageously also includes a control component which is determined as a function of the yaw rate deviation between the instantaneous yaw rate of the vehicle and a reference yaw rate.

In this way, the response of the vehicle to changes in steering angle in the nominal angle range is taken into account and can be adjusted especially reliably and safely.

Thus the course specified by the driver during braking on a heterogeneous road surface can be determined on the basis of the steering angle commanded by the driver, whereas the steering angle set on the steerable wheels is the angle that rapidly and reliably stabilizes the driving status of the vehicle. To adjust the brake pressure, the driving status and in particular the yawing performance of the performance can be determined and evaluated, as already described, on the basis of the deviation between the nominal steering angle and the steering angle set by the driver.

In another preferred embodiment of the invention, which for these reasons is also especially suitable in combination with automatic adjustment of the nominal steering angle, the stability index is formed as a function of a deviation between a yaw rate of the vehicle and a nominal yaw rate determined in a vehicle model on the basis of at least one quantity, preferably the steering angle preselected by the operator of the vehicle.

It is also advantageous that the stability index is determined as a function of a lateral acceleration of the vehicle.

In addition, it is advantageous that the stability index is determined as a function of a sideslip angle and/or a sideslip angle velocity.

To evaluate the stability index on the basis of the low coefficient of friction side and/or on the basis of the high coefficient of friction side, in a preferred embodiment of the invention, a plus or minus sign of the stability index is determined as a function of the low coefficient of friction side and/or as a function of the high coefficient of friction side.

In adapting the brake pressures on the basis of the stability index, no further case differentiation is necessary with regard to the low coefficient of friction side and/or the high coefficient of friction side, due to such a choice of the plus or minus sign of the stability index.

The brake pressure here is preferably modified as a function of the result of a comparison of the stability index with at least one threshold value.

An advantageous embodiment of the invention is characterized in that the brake pressure in the wheel brake on the high coefficient of friction side is increased in comparison with the brake pressure in the wheel brake on the low coefficient of friction side when the stability index exceeds a predetermined threshold value.

To ensure driving stability of the vehicle so it is especially reliable, the brake pressure difference between the brake pressure in the wheel brake on the low coefficient of friction side and the brake pressure in the wheel brake on the high coefficient of friction side is preferably limited.

In an advantageous embodiment of the invention, the brake pressure difference is limited as a function of a speed of the vehicle.

Owing to the inherent dynamics of a vehicle, there is a greater tendency at high speeds to an unstable driving performance and therefore preferably little or no brake pressure difference is allowed at high speeds to reserve a high lateral force potential, i.e., a high lateral force reserve on the rear axle according to the select-low control method.

In an embodiment of the invention which is also advantageous, no change in the brake pressure is allowed if the low coefficient of friction side and/or the high coefficient of friction side are switched because a change in the low and/or high coefficient of friction sides often results in unstable driving states. The brake pressure difference required in such a case is equal to zero, which is maintained until objectively stable driving performance is indicated again by the stability index. Then a new build up of pressure is possible again as a function of the stability index.

In another advantageous embodiment of the invention, the brake pressure difference on the rear axle is limited to a predetermined contribution of the brake pressure difference established on the basis of an ABS control method and/or the brake pressure ratio on the rear axle.

The ABS control takes into account the coefficient of friction ratios prevailing on the front axle, which can thus be anticipated for the rear axle, which reaches these conditions with a time lag, when driving forward.

The lateral force potential on the basis of the known select-low control on the rear axle offers increased safety in stabilization of the vehicle and in maneuvering, especially in turning.

In an advantageous embodiment of the invention, it is therefore provided that a change in the brake pressure is performed only when it is determined that the vehicle is driving straight ahead.

When turning, the conventional ABS control can be implemented; although ABS control is associated with a longer braking distance, it ensures a particularly high lane stability of the vehicle.

When turning is detected, however, a softening of select-low control method is also conceivable. The pressure increase should take place with a lower gradient, however, and the brake pressure difference, i.e., the brake pressure ratio between the high coefficient of friction wheel and the low coefficient of friction wheel, should be limited to a greater extent to provide adequate lateral reserve force for the vehicle for turning.

The invention also provides a device for performing the method. This is a device for controlling the brake pressure difference between the brake pressure in a wheel brake on the low coefficient of friction side and a wheel brake on the high coefficient of friction side of a vehicle during a braking operation on a road surface having a heterogeneous coefficient of friction, comprising

- a detection means for detecting the low coefficient of friction side and/or the high coefficient of friction side,
- a determination means for determining a stability index that represents a driving state of the vehicle,
- an evaluation means for evaluating the stability index on the basis of the low coefficient of friction side and/or the high coefficient of friction side detected by the detection means and
- a calculation means for determining the brake pressure difference as a function of a value of the stability index and a result of the evaluation of the stability index on the basis of the low coefficient of friction side and/or the high coefficient of friction side.

Other advantages, particulars and expedient embodiments of the invention are evident from the following description of preferred exemplary embodiments with reference to the figures.

BRIEF DESCRIPTION OF THE DRAWINGS

In the figures

DETAILED DESCRIPTION OF THE DRAWINGS

Figure 1:
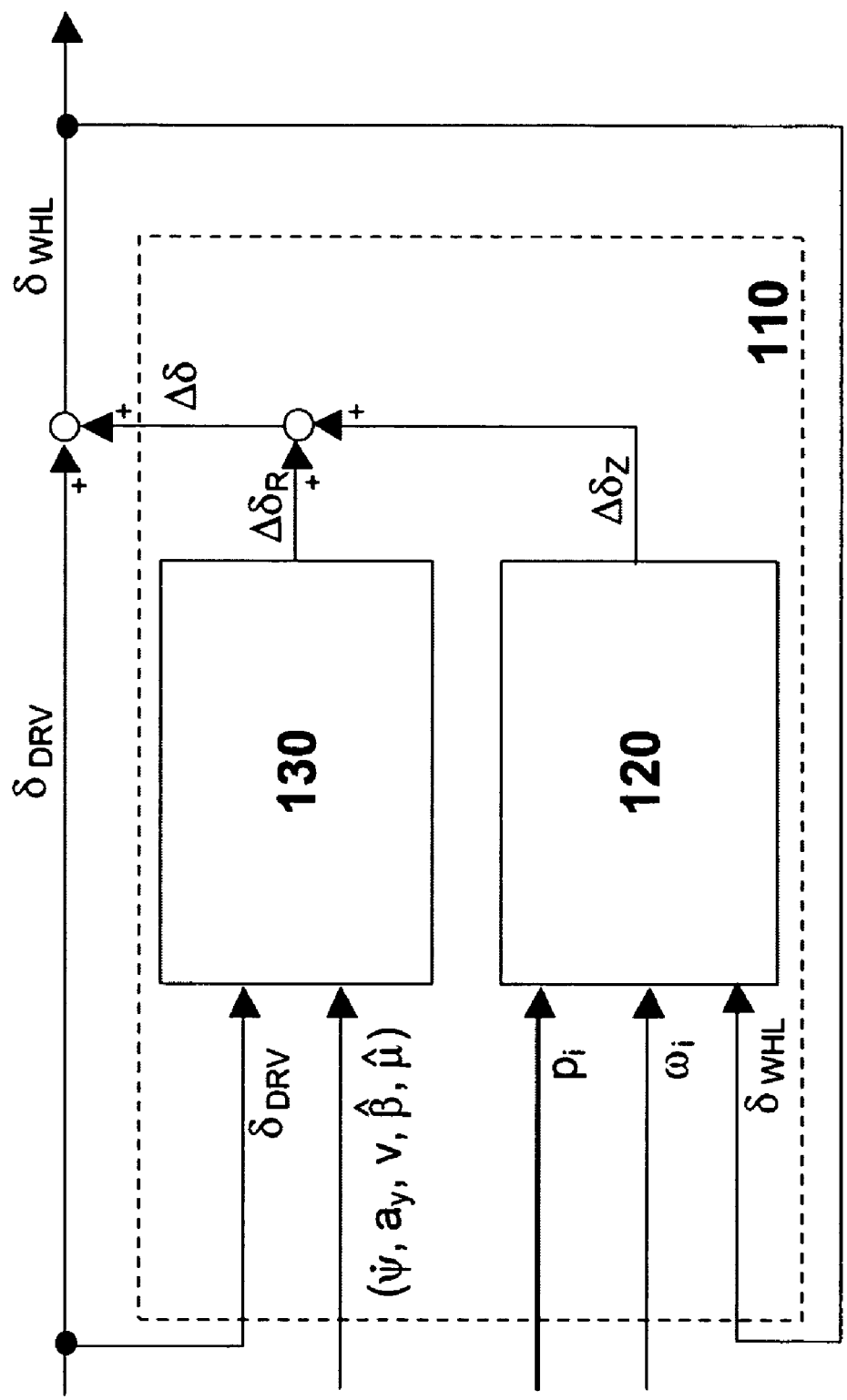
FIG. 1 shows a block diagram of a steering angle controller.

As an example, a four-wheel-drive vehicle is assumed, having a hydraulic brake system designed for implementation of an ABS control method for controlling the wheel slip on the wheels of the vehicle. In particular, the vehicle has the required sensors with which those skilled in the art are familiar, such as wheel rpm sensors and brake pressure sensors, actuators, e.g., a controllable pressure supply and controllable valves on the wheel brake cylinders as well as one or more control units for controlling the actuators.

However, the invention may also easily be applied to vehicles having different brake systems, e.g., electric or pneumatic brake systems.

In addition, the vehicle preferably has a steering system with which an additional steering angle $\Delta\delta$ may be superimposed on the steering angle $\Delta_{DRV}$ commanded by the driver. The vehicle may be equipped with a so-called superpositioning steering with which a planetary gear used in the steering system allows additional steering motions to be superimposed on the driver's steering motions. Likewise, a so-called steer-by-wire steering system may be used. It is also possible here to use a device for actively influencing the rear wheel (active rear wheel steering systems such as electromechanical rear wheel steering systems or actively triggerable rear axle bearings for generating rear wheel steering angles).

A vehicle equipped in this way makes it possible to adjust a nominal steering angle $\delta_{nominal}$ on the basis of an additional steering angle $\Delta\delta$ during a so-called μ-split braking, i.e., a braking operation on a road surface having a heterogeneous coefficient of friction, this nominal steering angle resulting in a yawing torque which compensates for the interfering yawing torque $M_Z$ caused by the different braking forces on the high coefficient of friction side (high μ) side and the low coefficient of friction side (low μ) side. The vehicle can thus be stabilized rapidly and reliably in an instance of μ-split braking.

This makes it possible to employ a "more aggressive" brake pressure control method in μ-split situations. In particular, it is provided here that the brake pressure difference $\Delta p$ is adjusted between the brake pressures in the wheel brake cylinders on the rear axle in which the brake pressure $p_{High}$ is increased in the wheel brake on the wheel on the high coefficient of friction side (high wheel) in comparison with the brake pressure $p_{Low}$ in the wheel brake on the wheel on the low coefficient of friction side (low wheel). This corresponds to a modification of the select-low control method explained in the beginning, which produces a rapid deceleration of the vehicle in a case of μ-split braking.

For detection of μ-split situation, driving dynamics parameters and brake parameters measured by the sensors in the vehicle as well as the estimated parameters are used; these values can be supplied by a driving dynamics control method. This may be a yaw rate control method ESP (Electronic Stability Program) and/or an antilock brake system (ABS).

Furthermore, a check is performed to determine whether the μ-split braking has occurred while driving the vehicle straight ahead or while turning the vehicle. Whether the vehicle is driving straight ahead or turning can be determined in particular on the basis of the yaw rate $\dot{\psi}$ of the vehicle, which can be measured with a yaw rate sensor, for example, the lateral acceleration $a_y$ of the vehicle, which can be measured with a lateral acceleration sensor, for example, as well as the steering angle $\delta_{DRV}$ set by the driver on the steerable wheels of the vehicles.

These signals are then used to ascertain whether the vehicle is driving straight ahead or turning. Turning is detected, for example, when values of the aforementioned signals exceed a predetermined threshold value, and it is possible to ascertain on the basis of the plus or minus signs of these signals whether it is turn to the right or a turn to the left. Straight ahead driving is detected accordingly when the values of the aforementioned signals are lower than predetermined threshold values. However, these signals may also be represented in the form of a turn index (e.g., turn index=⅓*[K1*yaw rate+K2*steering angle+K3*lateral acceleration]), and turning is ascertained when this turn index exceeds a threshold value for turning. If the turn index does not exceed the threshold value for turning, this indicates that the vehicle is driving straight ahead, and therefore this is recognized accordingly. In the threshold value, a hysteresis for the transition between the turning condition and the straight ahead condition should be taken into account.

A braking operation on a heterogeneous road surface is detected in particular on the basis of the speed vehicle and on the basis of the wheel speeds $v_i$ and brake pressures $p_i$ in the wheel brakes on the right front wheel (i=vr), on the left front wheel (i=vl), on the right rear wheel (i=hr) and on the left rear wheel (i=hl).

A longitudinal wheel slip $\lambda$ of the wheel i can then be ascertained by comparing the wheel speeds $v_i$ and the vehicle speed v, which indicates the extent to which the wheel has a tendency to wheel lock. A similar detection of the driving situation and in particular the longitudinal wheel slip $\lambda$ of a wheel is performed for activation of an ABS system which prevents the wheel from locking up by maintaining or lowering the brake pressure $p_i$.

To detect µ-split braking and to activate the steering angle control system as well as to determine the brake pressure $\Delta p$ on the rear axle, the rules described below may thus be used. These are based on the ABS control strategy of yawing torque limitation on the front axle and select-low control on the rear axle as already discussed above.

At the start of µ-split braking while driving straight ahead, the system recognizes if one of the following conditions is met:
  a) One front wheel is under ABS control for a predetermined period of time while the other front wheel is not under ABS control.
  b) Both front wheels are under ABS control and the difference between the brake pressures $p_i$ on the front wheels exceeds a predetermined threshold value.
  c) Both front wheels are under ABS control for a predetermined period of time, and ABS wheel lock pressure on at least one front wheel exceeds a predetermined threshold value and the ABS wheel lock pressure on one front wheel amounts to a predetermined multiple of the locking pressure on the other front wheel.

An end to µ-split braking while driving straight ahead is recognized if one of the following conditions is met:
  a) No front wheel is under ABS braking.
  b) The ABS wheel lock pressure on both front wheels is lower for a predetermined period of time than a predetermined threshold value.
  c) The ABS wheel lock pressure on a front wheel amounts to less than a predetermined multiple of the ABS wheel lock pressure on the other front wheel.

While turning, the start of µ-split braking is detected when one of the following conditions is met:
  a) The outer wheel in the curve enters ABS control prior to the inner wheel on the curve.
  b) Both front wheels are under ABS control for a predetermined period of time and at least one front wheel has an ABS wheel lock pressure that exceeds a predetermined threshold value and the ABS wheel lock pressure on the front wheel on the inside of the curve amounts to at least a predetermined multiple of the ABS wheel lock pressure on the outer front wheel in the curve.

An end of µ-split braking when turning is detected when one of the following conditions is met:
  a) No front wheel is under ABS control.
  b) The ABS wheel lock pressure on both front wheels is lower for a predetermined period of time than a predetermined threshold value.
  c) The ABS wheel lock pressure on the front wheel on the inside of the turn is lower than a predetermined multiple of the ABS wheel lock pressure on the front wheel on the outside in the turn.

The steering angle control is activated on the basis of an activation signal when it assumes a value of 1.

In the case of an ignition restart, this activation signal is set at the value 0. A change to the value 1 is implemented in particular when µ-split braking is detected as described above.

Preferably, however, one or more additional conditions must also be met for the activation signal to assume a value of 1. Such conditions are also investigated, for example, a certain ABS control strategy such as a delay in buildup of the yawing torque on the front axle or a select-low control on the rear axle.

For example, the activation signal is set at a value of 1 when a difference in the coefficient of friction µ for wheels on the right and the left, estimated in an ABS control, exceeds a predetermined threshold value. Furthermore, the results of a driving situation detection determined in an ABS system and/or an ESP system may also be taken into account in activation of the steering angle control.

The activation signal is reset from a value of 1 to a value of 0 when the end of µ-split braking is detected and one or more of the other conditions taken into account are no longer satisfied. Under conditions based on a comparison of a quantity with a threshold value, other threshold values are preferably used than those in activation, so the control is stabilized by a hysteresis.

The block diagram in FIG. 1 illustrates an advantageous embodiment of a steering angle controller 110 for adjusting the nominal steering angle $\delta_{Setpoint}$. The controller includes a block 120 in which an additional steering angle $\Delta\delta_Z$ is determined on the basis of an estimated value $M_Z$ of the interfering yawing torque $M_Z$. The adjustment of the additional steering angle requirement $\Delta\delta_Z$ corresponds to intrusion of an interference quantity on the basis of the control component of the manipulated variable for compensation of the interfering yawing torque $M_Z$. In addition, a driving state controller 130 is provided, determining a control component $\Delta\delta_R$ of the additional steering angle $\Delta\delta$ in which additional interference and in particular the vehicle are taken into account.

The additional steering angle $\Delta\delta$ which is superimposed on the steering angle $\delta_{DRV}$ set by the driver is obtained as the sum of the control component $\Delta\delta_Z$ and the control component $\Delta\delta_R$.

Figure 2:
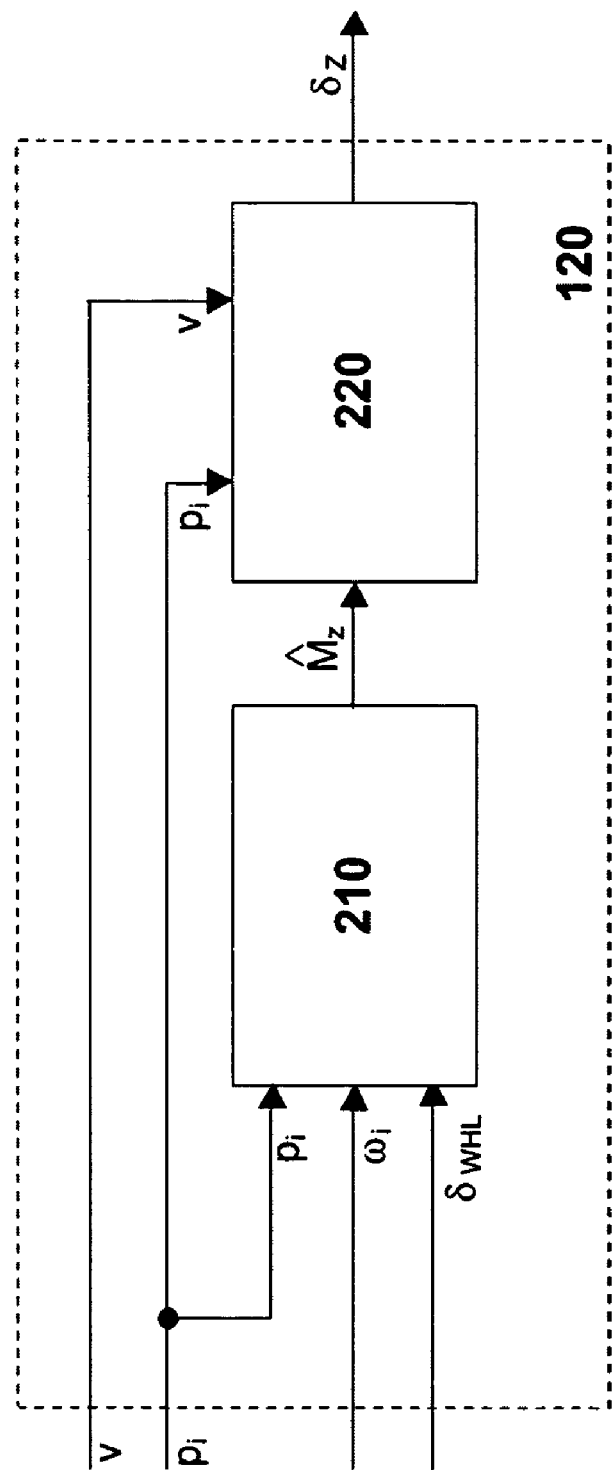
FIG. 2 shows a block diagram of a block of the steering angle controller depicted in FIG. 1 in which a control component of an additional steering angle is determined.

A preferred embodiment of block 120 for determining the control component $\Delta\delta_Z$ of the additional steering angle $\Delta\delta$ is shown in FIG. 2. The steering angle $\delta_{WH1}$ on the steerable wheels of the vehicle, the brake pressures $p_i$ on the wheel brakes, the angular velocities $\omega_i$ of the wheels of the vehicle and the reference speed v of the vehicle serve as input signals for the block 120.

An interfering yawing torque $M_Z$ which is estimated in block 210 is induced by the different braking forces $F_{x,i}$ (i=vr, vl, hr, hl) on the wheels of the vehicle in a µ-split situation.

The following equation is obtained from an equilibrium condition for the torques about the vertical axis of the vehicle:

$$M_Z = \cos(\delta_{WHL}) \cdot [s_l \cdot F_{x,vl} - s_r \cdot F_{x,vr}] - \sin(\delta_{WHL}) \cdot l_v \cdot [F_{x,hl} - F_{x,hr}] + s_l \cdot F_{x,hl} - s_r \cdot F_{x,hr}$$

where $s_l$ denotes the distance between the center of gravity of the vehicle and the left wheel contact point in the transverse direction of the vehicle, $s_r$ denotes the distance between the center of gravity of the vehicle and the right wheel contact point in the transverse direction of the vehicle, and $l_v$ denotes the distance between the center of gravity of the vehicle and the front axle in the longitudinal direction of the vehicle.

In an advantageous embodiment of the invention, locking of the wheels of the vehicle is prevented by an ABS control system. It is thus possible to assume a linear correlation between the braking forces $F_{x,i}$ on the wheels and the brake pressures $p_i$ in the wheel brakes, so the braking forces $F_{x,i}$ are determined on the basis of the following equation:

$$F_{x,i} = K_{pi} \cdot p_i (i = vr, vl, hr, hl)$$

The proportionality constants $K_{pi}$ are determined, for example, in driving experiments, but they can also be determined from the brake parameters such as the brake coefficient of friction, the effective brake disk radius and the brake piston diameter and may be stored in block 210.

It is of course also possible to use sensors, e.g., side wall torsion sensors or measuring rims, which measure the braking forces $F_{x,i}$ directly for determining the braking forces $F_{x,i}$.

On the basis of the estimate $\hat{M}_z$ for the interfering yawing torque $M_z$ which is transmitted from block 210 to block 220, the control component $\Delta\delta_Z$ of the additional steering angle $\Delta\delta$ is determined in an inverse vehicle model, where a linear single-track model is preferably assumed and the relationship between the interfering yawing torque $M_Z$ and the steering angle is linearized for a stationary driving state.

The control component $\Delta\delta_Z$ is determined by multiplying the interfering yawing torque $M_Z$ times an amplification factor $K_M$:

$$\Delta\delta_Z = K_M \cdot M_Z$$

It has been found that this relationship has a dependence on the vehicle speed v and the brake pressure $p_i$. Consequently, the amplification factor $K_M$ is determined adaptively as a function of these quantities, e.g., on the basis of characteristic lines which are determined in driving tests and the following equation holds:

$$\Delta\delta_Z = K_M(v, \{p_i\}) \cdot M_Z$$

It has also been found that the brake pressures $p_{hr}$ and $p_{hl}$ in the wheel brakes on the rear axle have only a minor influence. Furthermore, the brake pressures $p_{vr}$ and $p_{vl}$ in the wheel brakes on the front axle can be combined. In a preferred embodiment of block 220, the additional steering angle component $\Delta\delta_Z$ may therefore be determined on the basis of an equation of the following form:

$$\Delta\delta_R = K_M\left(v, \frac{p_{v1} + p_{vr}}{2}\right) \cdot M_Z \quad (4)$$

As already explained, it is impossible to ideally compensate the interfering yawing torque in all driving situations on the basis of the additional steering angle component $\Delta\delta_Z$ because it may be superimposed on other interference and inaccuracies may occur in the estimation of the interfering yawing torque $M_Z$ (inaccuracies in the parameters are reflected directly in the control signal as control errors due to the character of interfering quantity compensation). These inaccuracies result from inaccuracies in determination of the brake pressure $p_i$ in the wheel brakes or in changes in the coefficients of friction of the brake linings which may occur due to altered operating conditions such as an altered operating temperature or because of an increased operating lifetime.

Figure 3:
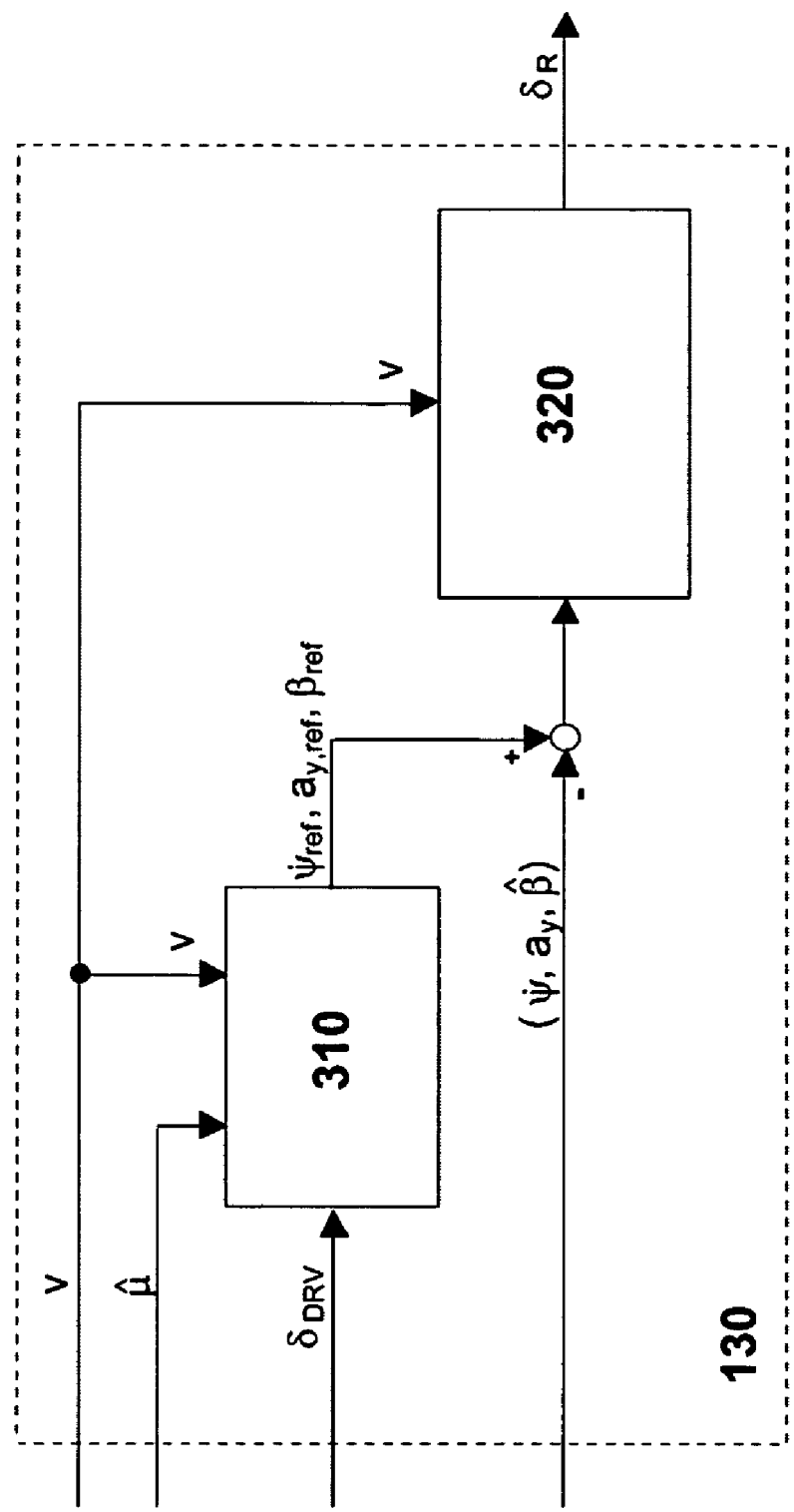
FIG. 3 shows a block diagram of a block of the steering angle controller illustrated in FIG. 1 in which a control component of the additional steering angle is determined.

Therefore, in block 120, a driving state control method is superimposed on the intrusion of the interfering variable in block 130, as shown in FIG. 1. Depending on the driving state variables, a control component $\Delta\delta_R$ of the additional steering angle $\Delta\delta$ is determined in block 130 as a function of driving state variables such as the yaw rate $\dot{\psi}$ of the vehicle and optionally in addition the lateral acceleration $a_y$ and the side-slip angle $\beta$ of the vehicle. A preferred embodiment of block 130 is depicted as a block diagram in FIG. 3.

The control component $\Delta\delta_R$ is based in particular on the yawing behavior of the vehicle. For analysis of the yawing behavior, a reference yaw rate $\dot{\psi}_{ref}$ is determined in a vehicle model in block 310 on the basis of the steering angle $\delta_{DRV}$ commanded by the driver and on the basis of the vehicle speed v. This is done using a reference model of the vehicle using a linear single-track model, for example. In an advantageous embodiment, a vehicle model that takes into account $\hat{\mu}$ for the (average) road surface coefficient of friction $\mu$, which can be determined on the basis of the measured lateral acceleration $a_y$, for example. This is also associated with the remaining coefficient of friction of potential in the reference yaw rate $\dot{\psi}_{ref}$.

An adaptive driving state controller 320, preferably designed as a proportional differential controller (PD controller), is used to determine the additional steering angle component $\Delta\delta_R$. The additional steering angle component $\Delta\delta_R$ is then obtained as the sum of a P component $\Delta\delta_{R,P}$ and a D component $\Delta\delta_{R,D}$:

$$\Delta\delta_R = \Delta\delta_{R,P} + \Delta\delta_{R,D}$$

The controlled variable for the P component $\Delta\delta_{R,P}$ is the yaw rate deviation $\Delta\dot{\psi}$. The control law $$\Delta\delta_{R,P} = K_{FB,P}(v) \cdot \Delta\dot{\psi}$$

is applicable for the steering request component resulting from the P component. The yaw rate deviation $\Delta\dot{\psi}$ is defined as the difference between the measured yaw rate $\dot{\psi}$ of the vehicle and the reference yaw rate $\dot{\psi}_{ref}$:

$$\Delta\dot{\psi} = \dot{\psi} - \dot{\psi}_{ref}$$

The yaw rate of the vehicle $\dot{\psi}$ is measured directly with a yaw rate sensor. The yaw rate sensor together with a lateral acceleration sensor is integrated into a sensor cluster in which the yaw rate $\dot{\psi}$ as well as the transfer acceleration $a_y$ are measured using redundant sensor elements.

The amplification factor $K_{FB,P}(v)$ for the controller feedback of the yaw rate deviation $\Delta\dot{\psi}$ is adapted on the basis of the current vehicle speed v. Since the vehicle speed has a significant influence on the driving performance of the vehicle, this is taken into account in the controller amplification and also in the control circuit of the vehicle which is closed via the controller.

The controlled variable for the D component $\Delta\delta_{R,P}$ of the additional steering angle component $\Delta\delta_R$ is a yaw acceleration deviation $\Delta\ddot{\psi}$. The rule law $$\Delta\delta_{R,D} = K_{FB,D}(v) \cdot \Delta\ddot{\psi}$$

is applicable for the steering request component resulting from the D component. The yaw acceleration deviation $\Delta\ddot{\psi}$ is determined by differentiation of the yaw rate deviation:

$$\Delta\ddot{\Psi} = \frac{d}{dt}\Delta\dot{\Psi} = \frac{d}{dt}(\dot{\Psi} - \dot{\Psi}_{ref})$$

The yaw acceleration deviation $\Delta\ddot{\psi}$ is thus based on the same signal sources as the yaw rate deviation $\Delta\dot{\psi}$ and is determined from this value by using a differentiating element.

The amplification factor $K_{FB,D}(V)$ for the controller feedback of the yaw acceleration deviation $\Delta\ddot{\psi}$ is adapted via the vehicle speed v. Since the vehicle speed v has significant influence on the driving performance of the vehicle, this is taken into account in the controller amplification and thus also in the vehicle's control circuit that is closed via the controller.

A control method similar to the yaw rate control method described here can be also be performed for the lateral acceleration $a_y$ and/or the sideslip angle $\beta$ of the vehicle, estimated from several driving state variables. Controlled variables then include a deviation between the lateral acceleration $a_y$ of the vehicle and a reference lateral acceleration $a_{y,ref}$ or a deviation between the estimated sideslip angle $\hat{\beta}$ of the vehicle and a reference sideslip angle $\beta_{ref}$, whereby the reference lateral acceleration $a_{y,ref}$ and the reference sideslip angle $\beta_{ref}$ may be preselected through corresponding threshold values. The corresponding reference quantities for the lateral acceleration and/or the sideslip angle, however, are preferably determined based on a model using the driver's specifications (e.g., single-track model).

When lateral acceleration $a_y$ and/or the sideslip angle $\beta$ are additionally taken into account, preferably by a P controller or a PD controller, corresponding components of the additional steering angle component $\Delta\delta_R$ are determined in the controller 320 and subsequently subjected to arbitration.

The control component $\Delta\delta_Z$ and the control component $\Delta\delta_R$ are added in an adding unit and the additional steering angle adjustment request $\Delta\delta$ obtained as the sum of the two components used transmitted to a control unit of the actuator used in the steering line, e.g., to a control unit of a superpositioning steering system and is used by the actuator.

The steering angle $\delta_{WHL}$ on the steerable wheels of the vehicle is thus obtained as the sum of the steering angle $\delta_{DRV}$ commanded by the driver and the additional steering angle $\Delta\delta$:

$$\delta_{WHL} = \delta_\Theta + \Delta\delta$$

Determination of the steering angle $\delta_{WHL}$ required for stabilization and the adjustment of the steering angle in μ-split braking then take place much more rapidly than would be required for an average driver to recognize the respective situation and respond to it by countersteering. This rapid response of the control system and the active steering system make it possible to adapt the electronic brake system ABS in such a way that the coefficient of friction potential on the individual wheels (especially on the high coefficient of friction side) can be better utilized.

To do so, the control strategies of ABS in μ-split braking are modified as follows:

The delay in buildup of the yawing torque on the front axle is greatly reduced so that a great pressure difference between the high wheel and the low wheel is established more rapidly on the front axle, i.e., a high pressure increase gradient is established on the high wheel.

Almost simultaneously with the buildup of the pressure difference, a yawing torque about the vertical axis of the vehicle develops. Owing to the estimate of the interfering yawing torque $M_Z$ from the brake pressure information or with the help of systems that measure tire forces directly, the control system immediately countersteers even before the driver would be able to perceive the situation from the yawing behavior of the vehicle.

In particular, select-low control of the ABS on the rear axle of the vehicle is also modified. This modification corresponds to a "softening" of the select-low control method in which a pressure difference $\Delta p$ between the brake pressure $p_{High}$ on the high wheel and the brake pressure $p_{Low}$ on the low wheel is determined on the basis of a stability index S.

In a preferred embodiment of the invention, the modification of the select-low control is superimposed on the select-low control performed by the ABS controller.

The brake pressure $p_{Low}$ in the wheel brake on the low wheel is determined exclusively by the ABS controller and the brake pressure $p_{High}$ in the wheel brake of the high wheel is determined on the basis of the allowed pressure difference $\Delta p$.

Figure 4:
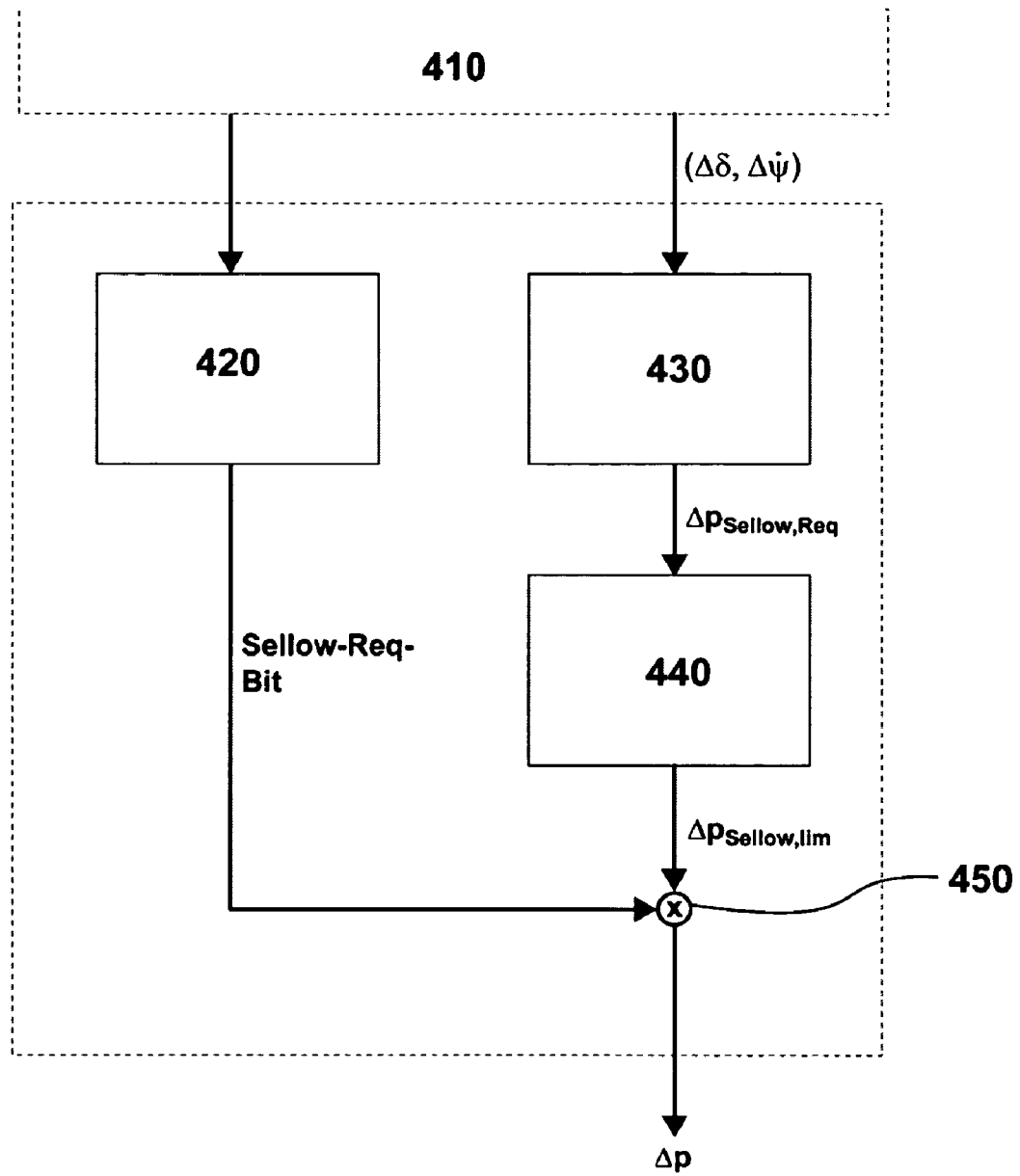
FIG. 4 shows a block diagram of a control system for modifying the select-low control method.

FIG. 4 shows a block diagram of a basic setup of a controller system 460 for modifying the select-low control. The input signals for this system are supplied by the ABS controller and the steering angle controller described previously, represented schematically here by block 410. The control system has a block 420 which contains a logic circuit for activation of the controller function, a block 430 for determining the pressure difference $\Delta p_{Sellow,Req}$ and a block 440 for limiting the pressure difference $\Delta p_{Sellow,Req}$.

The limited pressure difference $\Delta p_{Sellow,lim}$ corresponds to the adjustment request $\Delta p$ for the brake pressure which is adjusted by a pressure increase, a pressure reduction or pressure holding in the wheel brake of the high wheel, e.g., by means of an ABS control unit on the rear axle.

The select-low control is modified only when a Sellow-Req bit determined in block 420 assumes the value 1. If the Sellow-Req bit has a value of 0, then no pressure difference is allowed between the brake pressures in the wheel brakes on the rear axle. This is diagramed schematically in FIG. 4 on the basis of the multiplication unit 450 which reflects a value of the limited pressure difference $p_{Sellow,lim}$ which is different from 0 only when the Sellow-Req bit assumes a value of 1.

In a case of an ignition restart, the Sellow-Req bit in block 420 is set at a value of 0. To activate the controller function, the Sellow-Req bit is set from the value 0 at the value 1 when at least the following conditions are met:

a) μ-split braking is detected.

b) driving straight ahead is detected.

c) the low coefficient of friction side is detected.

Detection of the low coefficient of friction side is performed at the start of μ-split braking in the driving state controller 410 on the basis of the difference between the brake pressures in the wheel brakes on the right longitudinal side of the vehicle and hose on the left side. The longitudinal side of the vehicle on which the brake pressures of the wheel brakes are lower by a predetermined threshold value than the brake pressures on the other longitudinal side of the vehicle are recognized as the low coefficient of friction side.

Additionally or alternatively here, it is of course also possible to detect the high coefficient of friction side by a similar method.

The Sellow-Req bit is set back from the value 1 to value zero when the aforementioned conditions are no longer satisfied.

Figure 5:
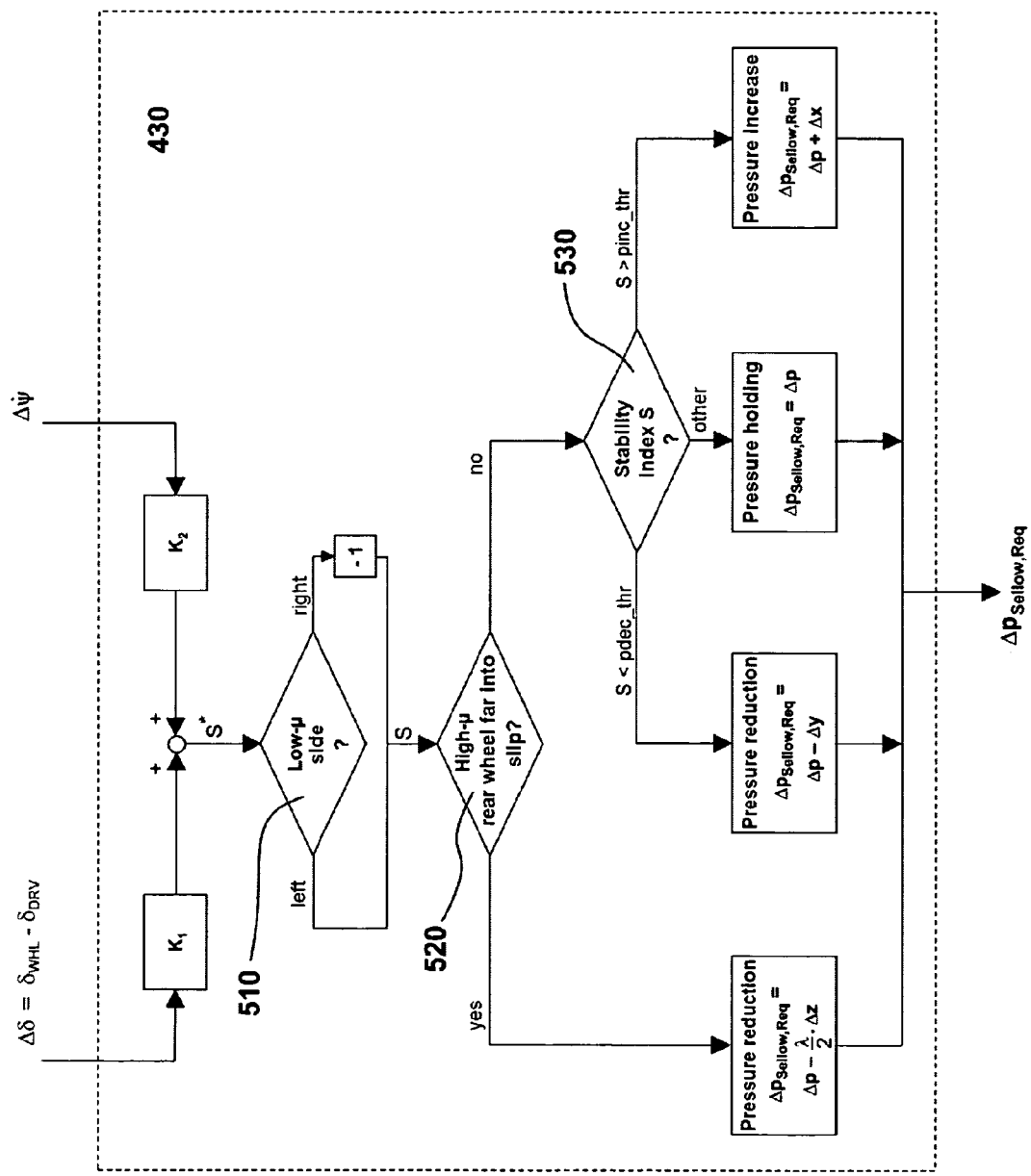
FIG. 5 shows a flow chart for a method for determining the brake pressure difference and FIG. 6 shows a flow chart for a method for limiting the brake pressure difference.

In a preferred embodiment of the invention, the steps illustrated on the basis of the flow charts shown in FIG. 5 are performed in block 430 for determining the brake pressure difference $\Delta p_{Sellow,Req}$.

The pressure difference $\Delta p_{Sellow,Req}$ gives the values of the brake pressure by which the brake pressure $p_{High}$ in the wheel brake of the high wheel is increased in comparison with the brake pressure $p_{Low}$ in the wheel brake of the low wheel. The brake pressure $p_{Low}$ is determined by the ABS controller on the basis of the longitudinal wheel slip λ of the low wheel in a known way. There is no provision for a reduction in the brake pressure $p_{High}$ to a value below the value $p_{Low}$.

First, from the additional steering angle $\Delta\delta$ determined in the steering angle controller 110 and the yaw rate deviation $\Delta\dot{\psi}$, a parameter S* is calculated:

$$S^* = K_1 \cdot \Delta\delta + K_2 \cdot \Delta\dot{\psi}$$

The amplifications $K_1$ and $K_2$ are positive and are determined in driving tests, for example.

On the basis of the parameter S* it is possible to determine whether the vehicle is yawing with a positive direction of rotation (i.e., to the left) or with a negative direction of rotation (i.e., to the right) and/or whether a yawing motion with a positive or negative direction of rotation is to be expected on the basis of a positive or negative additional steering angle $\Delta\delta$. However, it is also possible to determine on the basis of the parameter S* whether the driver or a driver assistance system assisting the driver has countersteered in the direction of the low coefficient of friction value.

In other embodiments of the invention, a deviation between the measured lateral acceleration $a_y$ of the vehicle and a reference lateral acceleration $a_{y,ref}$ and/or a deviation between an estimated sideslip angle $\beta$ of the vehicle and a reference sideslip angle $\beta_{ref}$, said deviation being weighted on the basis of a factor, is additionally to be taken into account as another summand in the parameter S*.

The reference lateral acceleration $a_{y,ref}$ and the reference sideslip angle $\beta_{ref}$ may be preselected on the basis of threshold values, for example. The corresponding reference values for the lateral acceleration and/or the sideslip angle are preferably determined based on a model using the driver's specifications (e.g., single-track model), however.

An evaluation of the quantity S* on the basis of the low coefficient of friction side (low $\mu$ side) is performed no the basis of query 510 and leads to the determination of the stability index S. In particular, the plus or minus sign of the stability index S is to be determined as a function of whether the low coefficient of friction side is on the right or left with respect to the longitudinal direction of the vehicle, which is ascertained on the basis of query 510. The following holds:

$$S = \begin{cases} S^*, & \text{if the low coefficient of friction side is on the left} \\ -S^*, & \text{if the low coefficient of friction side is on the right} \end{cases}$$

On the basis of the value of the stability index S determined in this way, it is possible to ascertain whether the vehicle is yawing in the direction of the low coefficient of friction side (with a positive/negative direction of rotation if the low coefficient of friction side is on the left/right) or whether the vehicle is yawing in the direction of the high coefficient of friction value (with a negative/positive direction of rotation if the low coefficient of friction side is on the left/right).

A positive value of S here is an indication that the vehicle is yawing in the direction of the low coefficient of friction side. The driving state of the vehicle in the $\mu$-split situation is stable at a positive value of the stability index S.

A negative or very small positive value of S indicates that the vehicle is yawing in the direction of the high coefficient of friction side and the driving state of the vehicle has not yet been stabilized through the steering intervention measures.

The evaluation of the quantity S* may of course also be performed here on the basis of the high coefficient of friction side. By a method similar to the evaluation procedure described above based on the low coefficient of friction side, a negative sign is set when the high coefficient of friction side is on the left for a determination of the stability index S.

In the determination of the pressure difference $\Delta p_{Sellow,Reg}$, first a query 520 ascertains—regardless of the value of the stability S—whether the high wheel on the rear axle has a tendency to lock up. This query includes a comparison of the wheel slip $\lambda$ of the high wheel with a preselected threshold value in block 520. If the wheel slip $\lambda$ of the high wheel exceeds the threshold value, the brake pressure on this wheel is reduced as a function of the wheel slip $\lambda$. However, the brake pressure $p_{High}$ on the high wheel does not fall below the value $p_{Low}$ of the brake pressure in the wheel brake of the low wheel, in accordance with the select-low control of the ABS system. If the high wheel does not show any locking tendency, then a change in the brake pressure difference $\Delta p$ is determined in each controlled cycle based on an analysis of the stability index S on the basis of query 530.

If the value of stability index S exceeds a preselected positive threshold value pinc_thr, then an increase in the pressure difference $\Delta p$ and thus a build up of pressure in the high wheel is performed. The pressure build up in this situation does not result in destabilization of the vehicle and instead serves to shorten the braking distance in $\mu$-split braking with a stable driving state of the vehicle.

In this case, the following brake pressure difference $$\Delta p_{Sellow,Req} = \Delta p + \Delta x$$

is obtained as the output signal of block 430, this brake pressure difference being greater than the instantaneous brake pressure difference $\Delta p$ by a preselected value $\Delta x$.

If the value of the stability index S is below a preselected value pdec_thr, then the pressure difference $\Delta p$ is reduced, thereby triggering a drop in pressure in the high wheel. In this case, an increase in pressure would exacerbate the yawing motion of the vehicle in the direction of the high coefficient of friction side and would thus lead to destabilization of the driving state. A reduction in pressure, however, increases the side force potential on the rear axle and makes it possible for the driver and/or the steering angle controller 110 to effectively countersteer against a possible unstable driving state.

As the output signal of block 430, the brake pressure difference is obtained here $$\Delta p_{Sellow,Req} = \Delta p - \Delta y,$$

this difference being smaller by a preselected value $\Delta y$ than the instantaneous brake pressure difference $\Delta p$. The value $\Delta y$ may correspond to the value $\Delta x$.

If the value of the stability index S is between the two threshold values pdec_thr and pinc_thr, then the brake pressure difference $\Delta p$ is kept constant. In this case, a "borderline" driving state prevails, and is evaluated anew in the next control cycle to perform a pressure reduction on the high wheel, if necessary, or to allow a pressure increase.

In this case, the brake pressure difference $$\Delta p_{Sellow,Req} = \Delta p$$

is obtained as the output signal of the block 430.

The aforementioned steps are performed once in each control cycle in block 430, resulting in a pulsed pressure increase and reduction with a gradient resulting from the values $\Delta x$ and/or $\Delta y$ or the brake pressure in the high wheel is maintained.

Figure 6:
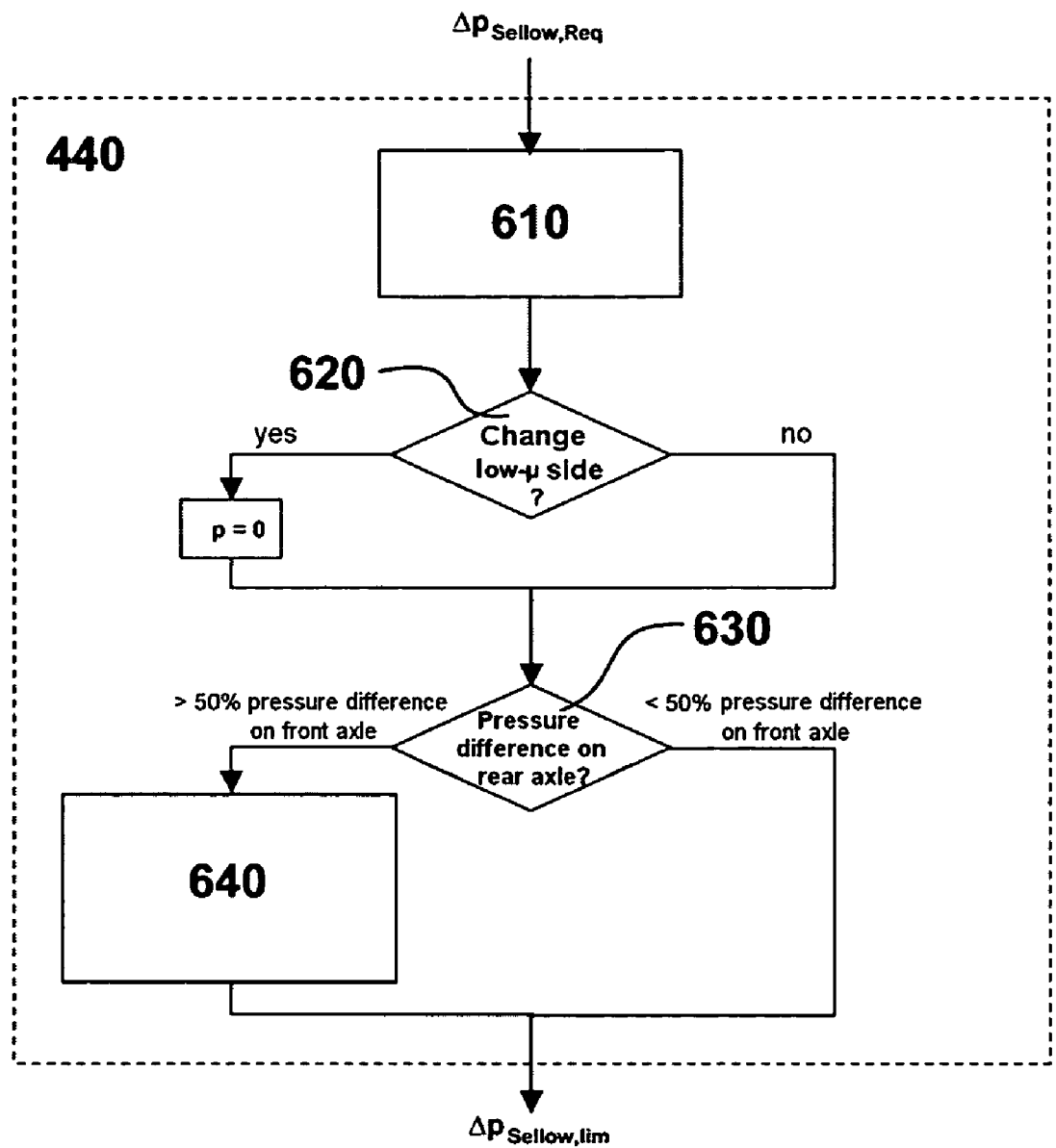

The brake pressure difference $\Delta p_{Sellow,Req}$ is preferably limited as a function of the driving situation. A preferred embodiment of block 440 for limiting the brake pressure difference $\Delta p_{Sellow,Req}$ is illustrated in FIG. 6 on the basis of a flow chart.

In this embodiment, there is first a speed-dependent limitation in step 610, where the limitation is based on a characteristic line, for example. Since a vehicle has a greater tendency toward instability at high speeds, little or no pressure difference Δp is allowed at high speeds. Due to this limitation, a high side force potential on the rear axle is thus kept as a stability reserve at high speeds.

If a change in the low coefficient of friction side is ascertained on the basis of query 620, then the pressure difference $\Delta p_{Sellow,Req}$ is reduced to a value of zero. When there is a change in the low coefficient of friction side, there is considerable risk of unstable driving states. To assist the driver and/or the steering angle controller in stabilizing the vehicle, therefore the select-low control method is relied on in such a change, namely as long as an objectively stable driving performance is not being signaled again via the stability index.

In query 630, the prevailing pressure difference on the rear axle is determined and compared with the pressure difference and/or the pressure ratio on the front axle. In step 640, the pressure difference and/or the pressure ratio $\Delta p_{Sellow,Req}$ on the rear axle is limited to a value of 50% of the pressure difference, for example, and/or the pressure ratio on the rear axle, if this value is exceeded.

Due to the ABS control, the brake pressures on the front axle are adjusted as a function of the friction values prevailing on the front axles. The pressure difference on the front wheels—when driving forward, as is assumed here—takes into account the coefficient of friction ratios which will also prevail again briefly on the rear axle. The brake pressures on the front axle are thus established at revised friction values at an early point in time. Owing to the limitation of the pressure difference on the rear axle as already described, however, these changes can already be anticipated by the control system.

The output signal of the block 440 for limiting the pressure difference $\Delta p_{Sellow,Req}$ is the limited pressure difference $\Delta p_{Sellow,lim}$ which corresponds to the adjustment request for the brake pressure difference Δp and is adjusted through a pressure increase, a pressure reduction or holding of the brake pressure $p_{High}$ in the wheel brake of the high wheel on the wheel axle. However, the value of the brake pressure $p_{Low}$ in the wheel brake of the high wheel does not fall below the value in the wheel brake of the low wheel.

In the embodiment of the invention illustrated so far on the basis of the figures, it is assumed that the steering angle which produces a yawing torque that compensated for the interfering yawing torque $M_Z$ and permits modification of the select-low control is adjustment by the steering angle controller 110.

However, at the same time it is also possible to perform a similar modification even when the driver is performing countersteering maneuvers.

In this embodiment of the invention, the value S* is determined by a different method. The procedure here is to save the steering angle $\delta_{DRV}(t_0)$ set by the driver at the start of μ-split braking at the point in time $t_0$ and to save the reference yaw rate $\psi_{ref}(t_0)$ calculated on the basis of this steering angle at the point in time $t_0$ and to determine the quantity S* in the following form, for example $$S^* = \tilde{K}_1(\delta_{WHL} - \delta_{DRV}(t_0)) + \tilde{K}_2(\psi - \psi_{ref}(t_0))$$

where $\tilde{K}_1$ and $\tilde{K}_2$ are preselected constants. No further modifications are necessary here.

The steering angle $\delta_{DRV}(t_0)$ and/or the yaw rate $\psi_{ref}(t_0)$ represent(s) the driver's turning intent. On the basis of a comparison of these values with instantaneous values $\delta_{WHL}$ of the steering angle on the steerable wheels and the yaw rate $\psi$ of the vehicle, it is determined whether the driver has initiated stabilizing measures such as countersteering in particular, which would permit a modification of the select-low control in the manner described above.

Furthermore, it has been described so far how the modification of the select-low control is performed only when the vehicle driving straight ahead has been detected. This is done so as not to endanger the lane stability of the vehicle which is ensured by the select-low control. However, it is likewise possible to perform the modification of the select-low control, as described previously, in a similar manner for turning. A restrictive limitation on the brake pressure difference may then be implemented, for example, and/or a slower pressure increase than in driving straight ahead may be provided.

The invention claimed is:

1. A method for controlling a brake pressure in wheel brakes mounted on a vehicle axle during a braking operation on a road surface having heterogeneous coefficients of friction, the method comprising the steps of
   determining a low coefficient of friction side and a high coefficient of friction side of the vehicle,
   forming a stability index representing a driving state of the vehicle,
   evaluating the stability index on the basis of at least one of the two members of the group consisting of the low coefficient of friction side and the high coefficient of friction side,
   modifying the brake pressure in at least one wheel brake as a function of the value of the stability index and as a function of a result of the evaluation of the stability index, and
   increasing the brake pressure in the wheel brake on the high coefficient of friction side in comparison with the brake pressure in the wheel brake on the low coefficient of friction side based on the stability index exceeding a predetermined threshold value.

2. The method according to claim 1, comprising the steps of
   employing an ABS control method for a wheel on the low coefficient of friction side and
   determining a brake pressure difference between the wheel brake on the high coefficient of friction side and the wheel brake on the low coefficient of friction side, wherein the wheel brakes are preferably mounted on one vehicle axle.

3. The method according to claim 1, wherein the stability index is determined on the basis of a deviation between an instantaneous yaw rate of the vehicle and a reference yaw rate determined in a vehicle model on the basis of a steering angle prevailing at the start of the braking operation.

4. The method according to claim 3, wherein the stability index is formed as a function of a deviation between a yaw rate of the vehicle and a nominal yaw rate determined in a vehicle model on the basis of at least one parameter preselected by the operator of the vehicle.

5. The method according to claim 1, wherein the stability index is formed on the basis of a deviation between an instantaneous steering angle and a steering angle prevailing at the start of a braking operating on a road surface having a heterogeneous coefficient of friction.

6. The method according to claim 5, wherein the stability index is determined as the function of a deviation between a steering angle commanded by the operator of the vehicle and a nominal steering angle set on the steerable wheels of the vehicle.

7. The method according to claim 6, wherein the nominal steering angle contains a control component which is determined in a vehicle model as a function of an interfering yaw torque in a vehicle model.

8. The method according to claim 6, wherein the nominal steering angle contains a control component which is determined as a function of the yaw rate deviation between a yaw rate of the vehicle and a reference yaw rate of the vehicle.

9. The method according to claim 1, wherein the stability index is determined as a function of a lateral acceleration of the vehicle.

10. The method according to claim 1, wherein the stability index is determined as a function of a sideslip angle or a sideslip angle velocity.

11. The method according to claim 1, wherein a plus or minus sign of the stability index is determined as a function of the low coefficient of friction side or as a function of the high coefficient of friction side.

12. The method according to claim 1, wherein the brake pressure is modified as a function of the result of a comparison of the stability index with at least one threshold value.

13. The method according to claim 1, wherein the brake pressure difference between the brake pressure in the wheel brake on the low coefficient of friction side and the brake pressure in the wheel brake on the high coefficient of friction side is limited.

14. The method according to claim 13, wherein the brake pressure difference is limited as a function of the speed of the vehicle.

15. The method according to claim 13 for a vehicle with a front axle and a rear axle, wherein a brake pressure difference on the rear axle is limited to a predetermined component of a brake pressure difference on the front axle.

16. The method according to claim 13 for a vehicle with a front axle and a rear axle, wherein a brake pressure ratio of the wheel brakes on the rear axle is limited to a predetermined component of the brake pressure ratio of the wheel brakes on the front axle.

17. The method according to claim 1, wherein no brake pressure difference is allowed between two wheels on an axle when at least one of the sides of high coefficient of friction and low coefficient of friction changes.

18. The method according to claim 1, wherein a change in the brake pressure is performed when it is detected that the vehicle is driving straight ahead.

19. The method according to claim 1 for a vehicle with a front axle and a rear axle, each equipped with two wheel brakes, wherein during turning a pressure increase is performed more slowly than a pressure decrease, and at least one of the two members of the group consisting of a brake pressure difference and the brake pressure ratio of the rear axle wheel brakes is limited in a more restrictive manner than when the vehicle is driving straight ahead.

20. The method according to claim 19, wherein turning is determined by means of a turn index obtained from a yaw rate, a steering angle and a lateral acceleration.

* * * * *